United States Patent [19]

Knapp

[11] Patent Number: 4,576,202

[45] Date of Patent: Mar. 18, 1986

[54] MIXING VALVE

[75] Inventor: Alfons Knapp, Biberach an der Riss, Fed. Rep. of Germany

[73] Assignee: Masco Corporation, Taylor, Mich.

[21] Appl. No.: 513,109

[22] Filed: Jul. 12, 1983

[30] Foreign Application Priority Data

Jul. 16, 1982 [IT] Italy ................................ 67906 A/82
Jan. 28, 1983 [IT] Italy ................................ 67096 A/83
Mar. 7, 1983 [IT] Italy ................................ 67253 A/83

[51] Int. Cl.[4] ............................................ F16K 11/06
[52] U.S. Cl. .............................. 137/625.17; 137/625.4
[58] Field of Search ......................... 137/625.17, 625.4

[56] References Cited

U.S. PATENT DOCUMENTS

| | | | |
|---|---|---|---|
| 2,020,286 | 11/1935 | Bittle | 137/625.13 |
| 2,639,116 | 5/1953 | Green | 137/625.17 |
| 3,384,119 | 5/1968 | Manoogian | 137/625.17 |
| 3,667,503 | 6/1972 | Farrell et al. | 137/625.4 |
| 3,747,638 | 7/1973 | Manoogian et al. | 137/625.4 |
| 3,854,493 | 12/1974 | Farrell | 137/625.4 |
| 3,965,935 | 6/1976 | Morisseau | 137/625.4 |
| 4,325,403 | 4/1982 | Uhlmann | 137/625.17 |
| 4,327,758 | 5/1982 | Uhlmann | 137/625.17 |
| 4,378,029 | 3/1983 | Parkinson | 137/625.4 |

*Primary Examiner*—Alan Cohan
*Assistant Examiner*—John A. Rivell
*Attorney, Agent, or Firm*—Steven L. Permut; Malcolm L. Sutherland; Leon E. Redman

[57] ABSTRACT

A mixing valve 10 has a cartridge assembly 20 therein which has stationary plate 22 having hot and cold openings 24 and 26 and a movable plate 28 slidably mounted thereupon. The movable plate has a surface 29 abutting plate 22 free from apertures. Valve plate 28 moves translationally between an open and closed position and rotated between a cold and hot position. The valve plate can be rotated through approximately 180 degrees with a tooth 66 of plate 28 leveling the mixing profile at the comfort zone between the hot and cold positions (FIG. 1).

6 Claims, 22 Drawing Figures

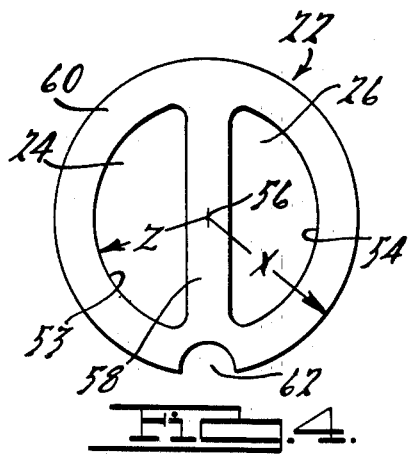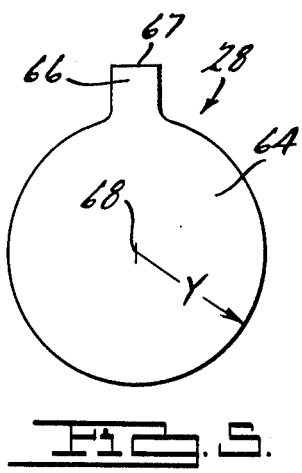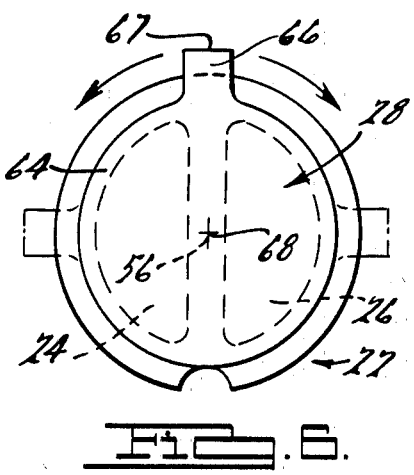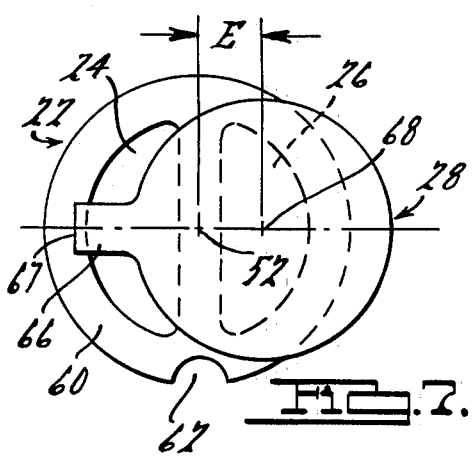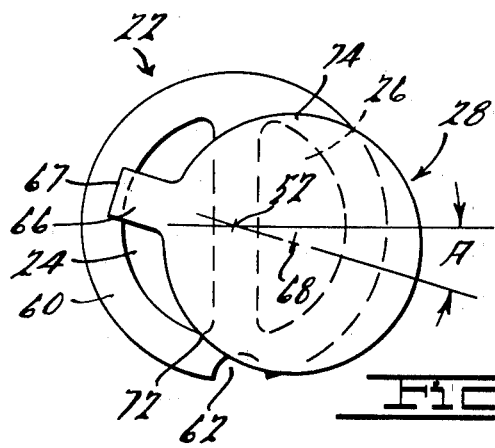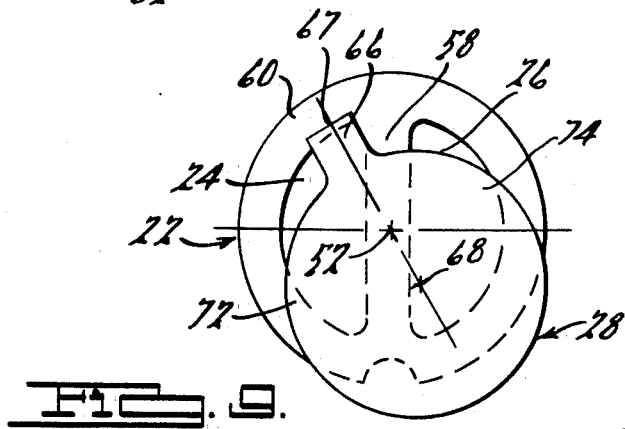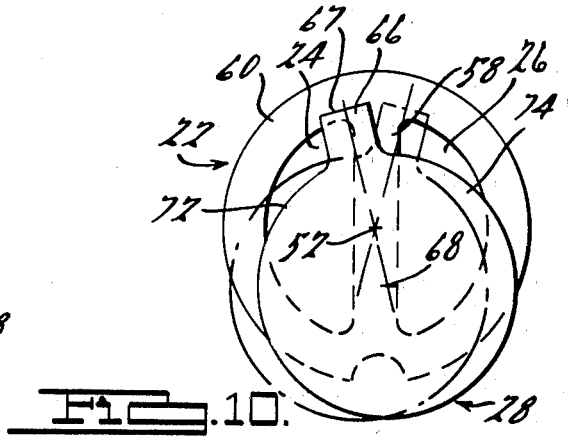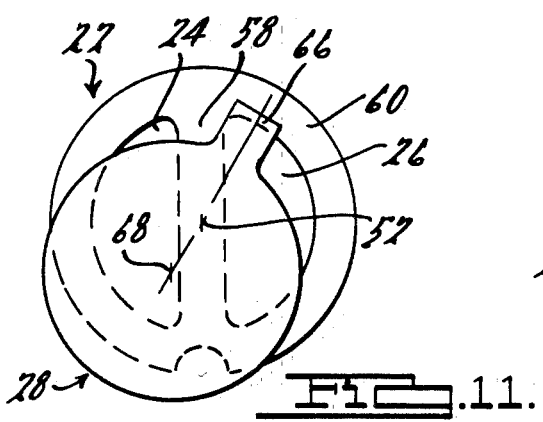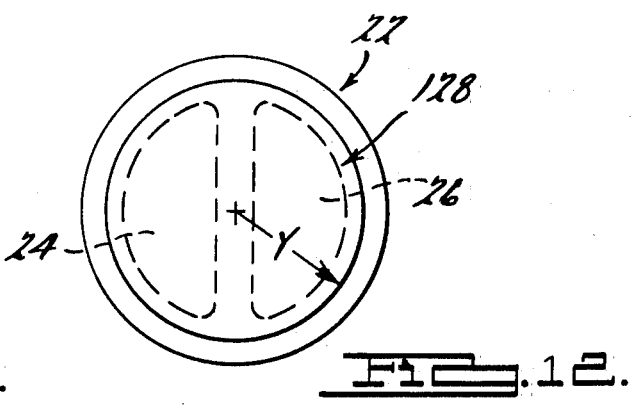

MIXING VALVE

BACKGROUND OF THE INVENTION

1. Technical Field of the Invention

This invention relates to fluid mixing valve and more particularly to a hot and cold water mixing valve.

2. Disclosure Information

Mixing valves are constructed with movable plates slidably mounted over a stationary plate. The movable plate is constructed for both translational and rotational movement with respect to the stationary plate. The movable plate most commonly has apertures therethrough which can be aligned or misaligned with respect of hot and cold ports through the stationary plate. Alternatively, the movable plate may have a notch at its periphery which can be aligned or misaligned with respect to arcuate openings in the stationary plate. A control mechanism includes a knob or operative lever that is operably connected to the movable plate.

The problem with all of these rotational and translationally movable plates is the narrow angle through which the aperture actively mixes the hot and cold water. Commonly the rotational angle of displacement is approximately forty (40) degrees from the position where only hot water flows to the position where only cold water flows. Because of the relatively limited degree of the mixing angle, a slight angular displacement of the control mechanism causes a relatively large temperature variation in the water. The large temperature variation is usually more severe near the midway point between the hot only and cold only position at what is commonly referred to as the comfort zone. Because of the large temperature variations corresponding to the slight angular displacement of the control mechanism, it is difficult to finely control temperatures near the comfort zone.

What is needed is a mixing valve that is constructed to allow mixing through an increased angular displacement of the moving plate. The angular displacement can be as large as approximately 180 degrees for controlling mixing water from two ports. What is also needed is a valve plate having a shape that cooperates with the stationary plate to slow down the rate of temperature change with respect to the angular displacement of the moving plate when it is within the comfort zone.

SUMMARY OF THE INVENTION

In accordance with the invention, a mixing valve has a housing with a first and second port for a first and second fluid respectively. Commonly the first and second fluids can be hot and cold water, respectively. A valve plate slidably sits on top of the first and second ports and is mounted for movement in both a translational and rotational mode. The valve plate has a surface facing and abutting the seat about said first and second ports. The abutting surface is free of any apertures or recesses. The surface has a perimeter about which fluid from the ports flows. The surface defined by the perimeter has a shape cooperating with the shape and location of the ports such that the mixing angle where cold and hot water mix together in varying proportions is greater than 90 degrees.

In one embodiment of the invention, the seat about the first and second ports include a stationary plate with a first and second opening therethrough. The movable plate is slidably mounted on top of the stationary plate for movement in both the translational and rotational mode.

The valve plate has a center portion that is convexly shaped and free from concave edges or concave angles. The movable valve plate is free of any projections radially extending from the center portion that extends more than 180 degrees about the perimeter of the valve plate center portion.

Because the movable plate opens and closes the openings through the stationary plate about its perimeter rather than by means of apertures or notches in the lower surface, the angular rotation where active mixing between hot and cold water takes place is greatly increased and can approach the value of 180 degrees. In addition, the movable plate can have a preselected shape to allow a particular mixture ratio of hot and cold water in any given position. In other words, the mixing profile can be selectively controlled by the proper selection of shapes and sizes of the ports and movable plate.

Preferably the rate of change of the mixing profile is decreased at approximately the midpoint between the hot and cold positions, i.e. the comfort zone. This insures adequate control of water temperature when it is mixed for comfort. Preferably the change of the ratio when the mixing profile in the comfort zone is controlled by a tooth radially extending from a center portion of the movable valve plate. The tooth may span a minor portion of the perimeter of the movable plate, for example, forty (40) degrees about the perimeter of the center portion of the movable valve plate.

The mixing valve according to the invention increases the control of the mixing ratio by increasing the angle through which mixing occurs. In addition, the mixing profile can also be varied. The movable valve plate can be a decreased size as compared to conventional plates. Consequently, the entire valve housing can have a reduced diameter without sacrificing flow rate.

BRIEF DESCRIPTION OF THE DRAWING

Reference now will be made to the following drawings in which:

FIG. 4 is a top plan view of the stationary plate shown in FIG. 1;

FIG. 5 is a top plan view of the movable plate shown in FIG. 1;

FIG. 6 is a top plan view of the stationary and movable plate shown in the closed position;

FIG. 7 is a top plan view of the plates when in an open position and at the full hot position;

FIG. 8 is a view similar to FIG. 7 showing the movable plate rotated to one end of the mixing range;

FIG. 9 is a view similar to FIG. 8 with the movable plate rotated to one end of the comfort zone;

FIG. 10 is a view similar to FIG. 9 with the movable plate shown within the comfort zone;

FIG. 11 is a view similar to FIG. 10 showing the movable plate rotated to the other end of the comfort zone;

FIG. 12 is a top plan view of a second embodiment of a movable plate shown in a closed position with respect to the stationary plate;

DETAILED DESCRIPTION OF THE PREFERRED EMBODIMENT

Figure 1:
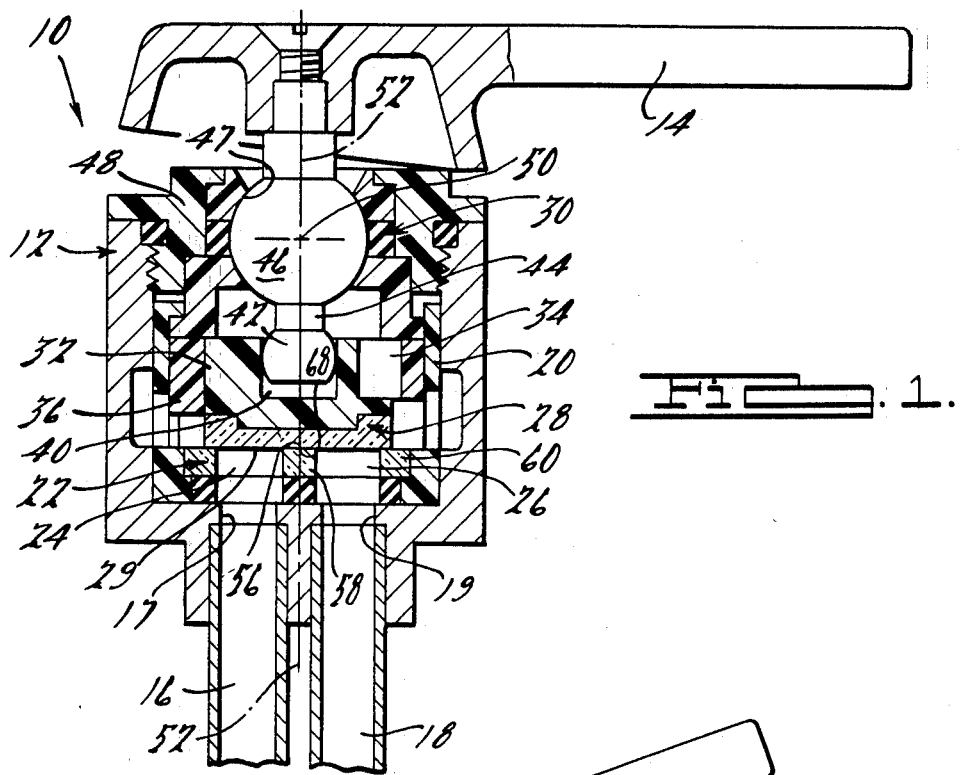
FIG. 1 is a side elevational cross-sectional view of a mixing valve according to the invention shown in a closed position.
Figure 3:
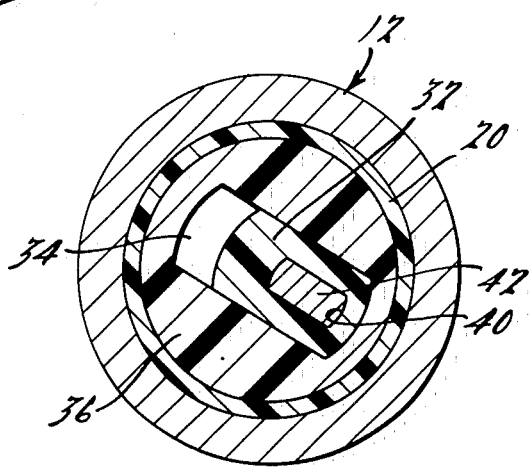
FIG. 3 is a cross-sectional view taken along line III—III shown in FIG. 2.

Referring to FIG. 1, a single handle control mixing valve 10 has a housing 12 and an operating lever 14. Two conduits 16 and 18 for hot and cold water, are connected to two ports 17 and 19 of housing 12. Above the conduits 16 and 18 is a cartridge body 20 fitted within housing 12 and containing stationary valve plate 22 having openings 24 and 26 in communication with respective ports 17 and 19. In addition, movable valve plate 28 is slidably mounted on top of stationary valve plate 22 such that its surface 29 abuts plate 22. A control mechanism 30 is operated by lever 14 to rotatably and translationally move the valve plate 28 with respect to the stationary plate 22. The control mechanism 30 includes a control head 32 fixedly secured to the movable plate 28. The control head 32 slidably fits within a slot 34 in rotatable guide ring 36 which is rotatably mounted within the cartridge body 20 as clearly shown in FIG. 3.

Figure 2:
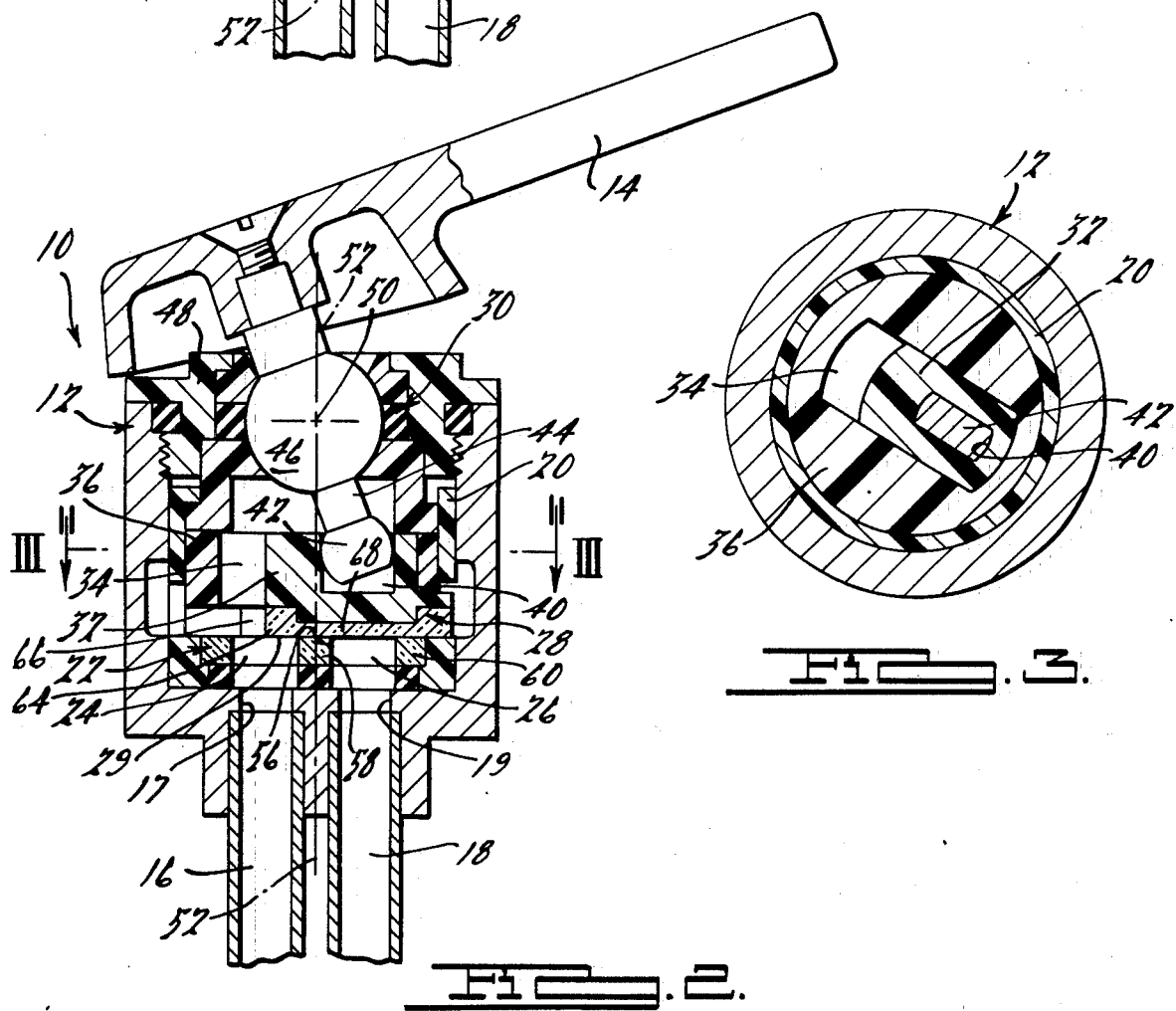
FIG. 2 is a view similar to FIG. 1 showing the mixing valve in an open position.

The control head 32 has a cavity 40 which receives a lower end 42 of a drive lever 44. Drive lever 44 has an integral spherical portion 46 which is seated in a socket 47 formed by the cartridge body 20 and cap 48 of housing 12. The operating lever 14 which is perpendicular to drive lever 44 can be in a closed position as shown in FIG. 1. In this position, the axis of drive lever 44 is perpendicular to the plates 22 and 28. The operating lever 14 can be lifted upwardly to pivot the drive lever 44 about a horizontal axis through center 50 of spherical portion 46 as shown in FIG. 2. The lower lever end 42 moves which in turn forces the control head 32 to translationally move within the slot 34. The control head 32 in turn forces the valve plate 28 to move with respect to valve plate 22. The lever 14 can also be swung from left to right which rotates drive lever 22 about a vertical axis 52 through center 50 which causes plate 28 to be rotated about the same vertical axis 52.

Referring now to FIGS. 4–11, details of the valve plates are more clearly shown. The stationary plate 22 as shown in FIG. 4 has its two openings 24 and 26 centered about point 56 that lies on axis 52. The opening 24 is for hot water and the opening 26 is for cold water. The openings 24 and 26 have outer edges 53 and 54 lying on a radius indicated as Z. The two openings 24 and 26 are separated by a bridge section 58 which extends from opposing ends of an annular section 60. The annular section 60 has an outer radius indicated as X. Both the bridge section 58 and annular section 60 are in close abutting contact with bottom surface 29. The outer peripheral of the annular section has a notch 62 which positions the plate 22 within the cartridge body 20.

As shown in FIG. 5, the movable valve plate 28 has a circular center portion 64 and a radially extending tooth 66. The center portion 64 has a radius indicated as Y which is greater than the radius Z of opening 52 and 54 but smaller than radius X. When the plate 28 is in the closed position as shown in FIG. 6, the center point 68 of the center circular portion 64 is aligned directly above the center point 56 of the stationary plate 22 on axis 52. Therefore in the closed position, lever 14 can be oscillated to rotate upper valve plate 28 to a preselected position, as shown in FIG. 6, before the valve plate 28 is translationally moved by an upward movement of lever 14 as shown in FIG. 2. When the lever 14 is moved upwardly, the control mechanism 30 translationally moves the valve plate 28 so that its center point 68 is displaced the amount E from the axis 52 as shown in FIG. 7. When this displacement occurs, the hot water opening 24 is partially uncovered to allow hot water to flow to a spout (not shown).

The tooth 68 radially extends from the perimeter of the center portion 64 a distance greater than the displacement distance E. In this fashion, the outer edge 67 of the tooth portion always remains seated on the annular section 60 of stationary plate 22 even when the valve is fully opened as shown in FIGS. 7–11.

When in an open position, the valve plate can be rotated over an angle indicated as A in FIG. 8 through which opening 26 remains covered. This angle A is referred to as a dead angle which is preferably predetermined to be about fifteen (15) degrees. Further rotation of the valve plate 28 about the pivot axis 52 causes the center point 68 of the center portion 64 to orbit about the pivot axis 52. As shown in FIG. 9, opening 26 becomes partially uncovered while opening 24 is being covered; hence, cold water is mixing with hot water. Further clockwise rotation from the position shown in FIG. 9 to the position shown in FIG. 10 causes opening 24 to further open while opening 24 remains approximately unvaried because as portion 72 of plate 28 covers more of the opening 24, the tooth section 66 begins to uncover an approximately equal area. Consequently, the uncovered portion of opening 24 merely changes form but not size when the tooth 66 slides off opening 24.

Furthermore, as shown in FIG. 10 in phantom, when the movable plate is moved more than 90 degrees from the position shown in FIG. 7, the tooth section 66 starts to cover opening 26 as portion 74 uncovers opening 54. Consequently, opening 26 remains the same size during this portion of rotation of plate 28 while opening 24 becomes increasingly restricted.

Referring to FIG. 11, once tooth section 66 is rotated to a position over opening 26, further rotation further opens opening 26 while opening 24 becomes further restricted and finally totally closed. As can be easily seen, the mechanical movement of the movable plate 28 over stationary plate 22 has symmetrical properties with respect to left and right as shown in the drawings.

The mixing profile thus starts out with having only hot water passing through opening 24 with no mixing of water for the first fifteen (15) degrees of rotation. From approximately fifteen (15) degrees to approximately sixty (60) degrees of rotation, opening 24 is gradually closed while opening 26 is gradually opened. From approximately sixty (60Q) degrees, as shown in FIG. 9, to a ninety (90) degree position, opening 26 continues to be opened while the uncovered section of opening 24 remains the same size. Beyond the ninety (90) degrees, a symmetrical relationship occurs as follows. Opening 26 remains unchanged from ninety (90) degrees to approximately one hundred and twenty-five (125) degrees while opening 24 is gradually further restricted. From one hundred and twenty-five (125) degrees to approximately one hundred and sixty-five (165) degrees opening 26 further opens while opening 50 becomes further restricted and finally totally closed. From one hundred and sixty five (165) degrees to one hundred and eighty degrees (180), no further mixing occurs.

Figure 13:
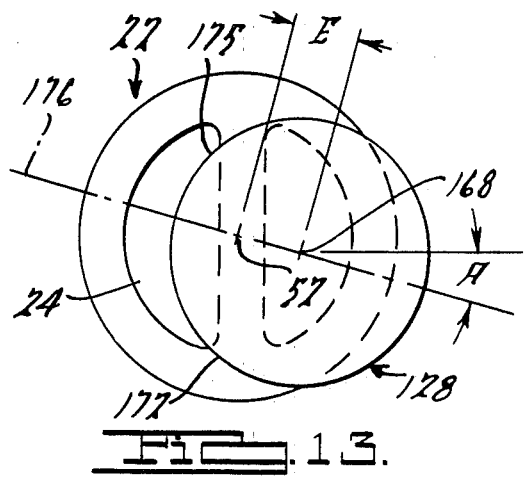
FIG. 13 is a view similar to FIG. 12 showing the movable plate moved to an open position and at one end of the mixing range.
Figure 14:
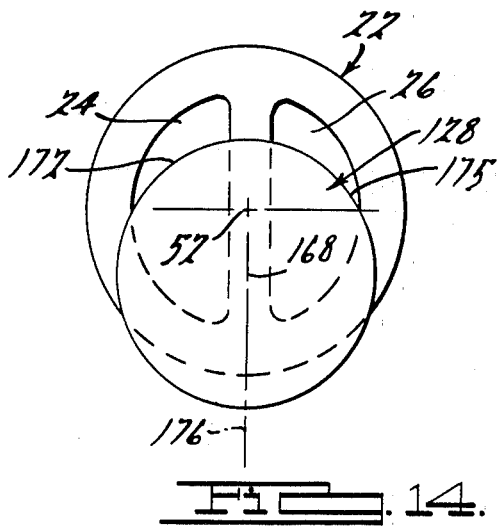
FIG. 14 is a view similar to FIG. 13 showing the movable plate at a mid-position between the hot and cold positions.

Referring now to FIGS. 12–14, a second embodiment of the top plate is disclosed in conjunction with the stationary plate 22. Top plate 128 has a circular shape with a radius Y large enough to cover the openings 24 and 26 when in the closed position as shown in FIG. 12. As with the first embodiment, the movable plate can rotate one hundred and eighty (180) degrees. The first 15 degrees of action indicated by angle A, showing in FIG. 13, causes no mixing of hot and cold water. As the movable plate 128 is rotated, the portion 172 of plate 128 covers sections of opening 24 while second portion 175 of plate 128 uncovers a smaller section of opening 24 such that the net area of opening 24 that is covered is increased. Portion 172 is separated from portion 175 by an axis 176 passing through axis 52 and center 168. When the movable plate 128 reaches a midway position as shown in FIG. 14, continued rotation causes portion 172 to further cover opening 24 while portion 175 continues to uncover opening 26. The movable plate by being circular is extremely simple to make. Even though it does not have the corrective action of the tooth as shown for the first embodiment, the plate 128 can uncover a larger area of the openings 24 and 26 to provide a greater amount of flow. As with the first embodiment, the circular plate 128 still has a mixing range spanning over one hundred and twenty (120) degrees.

Figure 15:
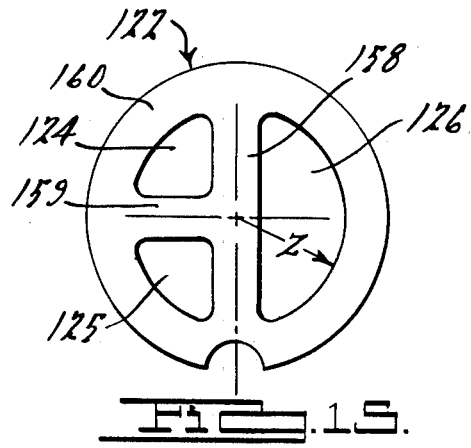
FIG. 15 is a top plan view of a second embodiment of the stationary plate.

Not only does the shape of the top plate determine the mixing profile, but the shape of the openings through the stationary plate can also affect the mixing profile. FIG. 15 discloses another stationary plate 122 which can be used with either of the aforementioned movable plates 28 or 128. Stationary plate 122 has two hot water openings 124 and 125 and the single cold water opening 126. The stationary plate has the center bridge portion 158 dividing the openings 124 and 125 from opening 126. The plate 122 also has a center bar 159 symmetrically positioned between openings 124 and 125. Bar 159, as well as bridge 158 and annular section 160 are all in close abutting relationship against the lower surface of the movable plate. The openings 124, 125 and 126 are all defined within the same radius Z as shown in FIG. 4. However, bar 159 affects the flow rate and the mixing rate of the hot water with the cold water to distinguish plate 122 from stationary plate 22. Bar 159 also gives support to the movable plate 122.

Figure 16:
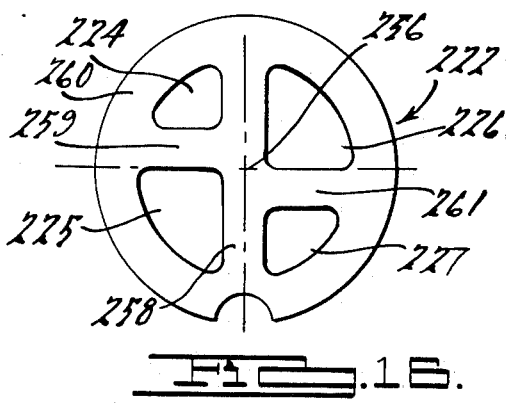
FIG. 16 is a top plan view of a third embodiment of the stationary plate.

FIG. 16 disclosed another embodiment of the stationary plate 222 which discloses a center bar 259 assymmetrically positioned with respect to the center point 256 and interposed between hot water openings 224 and 225. In addition, a bar 261 is assymmetrically positioned with respect to center point 256 and is interposed between two cold water openings 226 and 227. Furthermore, cold water opening 226 and 227 as well as hot water openings 224 and 225 have different sizes. The location and width of the bars 259 and 261 modify the mixture profile as the movable plate rotates over the plate 222. In addition, the bars 259 and 261 as shown in FIG. 16 provide support for the movable plate.

Figure 17:
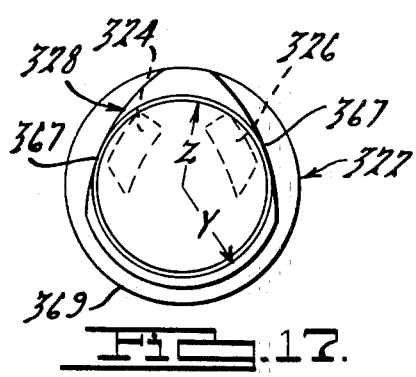
FIG. 17 is a top plan view showing another embodiment of the invention.

The movable plate does not have to have circular configurations. Neither do the openings through the stationary plates have to have arcuate outer edges defined at a given radius. FIG. 17 discloses an embodiment wherein slotted openings 324 and 326 in plate 322 have outer edges 353 and 354 not defined at radius Z. Only the radial outside points extend to radius Z with the remainder of the opening defined within a circle of radius Z. The upper plate 328 can have an oval edge 367 and another semicircular edge 369 all placed at or outside of radius Y.

Figure 18:
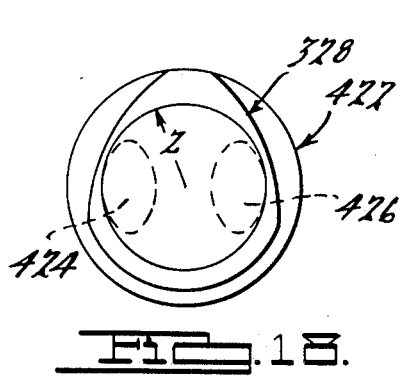
FIG. 18 is a top plan view showing another embodiment of the invention.

FIG. 18 discloses an embodiment wherein plate 328 is positioned on top of a stationary plate 422 that has two oval openings 424 and 426 positioned within a circle of radius Z.

Figure 19:
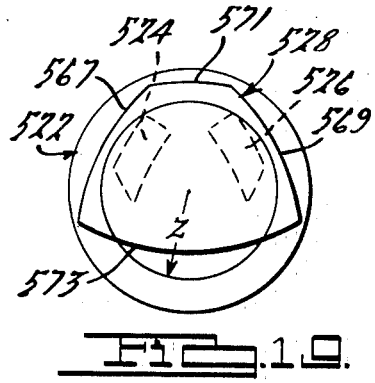
FIG. 19 is a top plan view showing another embodiment of the invention.

In addition, if the arc span between the full hot and the full cold position is less than 180 degrees, the upper plate does not have to have all of its outer perimeter outside of a certain radius. In FIG. 19, the upper plate 528 is fitted within a valve that allows the plate to rotate through approximately 120 degrees. The upper plate 528 has two arcuate edges 567 and 569 and an edge 571 therebetween. In addition, an arcuate edge 573 is interposed between the edges 567 and 569. The bottom plate 522 has two openings 524 and 526 defined within a circle of radius Z.

Figure 20:
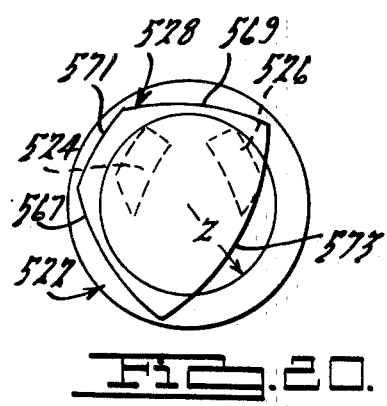
FIG. 20 is a view similar to FIG. 19 showing the movable plate in a closed position and rotated to an end position.

It is noted that the arcuate edge 573 is not totally outside of the radius Z. However, through the 60 degrees of rotation from the midposition as shown in FIG. 20 that plate 528 undergoes while in the closed position, neither opening 524 or 526 becomes uncovered.

Figure 21:
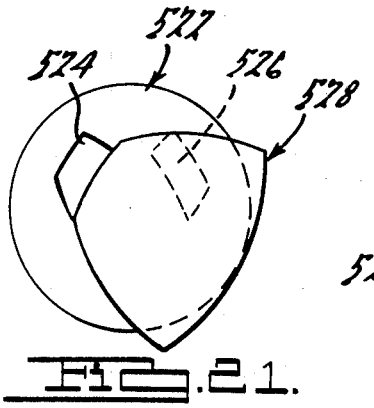
FIG. 21 is a view similar to FIG. 19 showing the plate moved to an open position.
Figure 22:
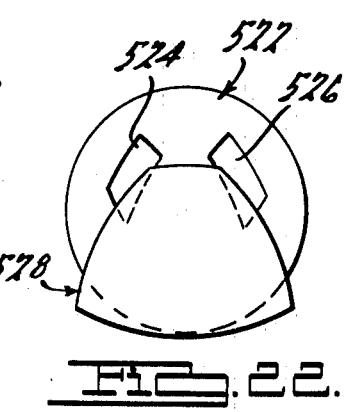
FIG. 22 is a view similar to FIG. 21 showing the movable plate rotated to a position midway between the hot and cold positions.

In operation, the plate 528 translationally moves to open one of the openings such as opening 524 as shown in FIG. 21. The plate 528 is rotated in the same fashion as described in the other embodiments such that the opening 524 becomes partially closed while, simultaneously, opening 526 becomes uncovered as shown in FIG. 22.

In this fashion, a mixing valve for a faucet is constructed that can actively mix different proportions of hot and cold water through rotation through a large angle approaching 90 degrees. The angle of rotation can exceed 90 degrees and can be adjusted up to 180 degrees.

Secondly, the contour of the movable plate in combination with the shape, size, and location of the openings in the stationary plate can cooperate to predetermine the mixing profile and the dead angle at each end of rotation of the valve.

Thirdly, the movable plate has no recesses in its surface abutting the stationary plate nor does it have apertures therethrough. Each of these plates has a center portion that is convex in shape and being free from any radially extending projections or protrusions that span more than 180 degrees about the center portion. These qualities make it easy to manufacture the movable plates.

Fourthly, the fact that the water flows about the movable plate and not through it allows the movable plate to be smaller and therefore less expensive to make. In addition, since the movable plate is smaller and the required movements for opening the valve plate require less room, the valve housing can have a smaller diameter without reducing the flow rate through the valve.

In addition, the stationary and movable valve plates can be housed within a cartridge body which can be fitted in the valve housing or can be as with other valve plates fitted within the valve housing as separate members.

Variations and modifications of the present invention are possible without departing from its scope and spirit as defined by the appended claims.

The embodiments in which an exclusive property or privilege as claimed are defined as follows:

1. A flow control mixing valve characterized by:
   a housing structure; a fixed plate being operatively fixed within said housing structure, having an upper surface, and having at least two openings for the passage of a first and second fluid respectively; a movable plate having a lower surface positioned in sliding contact with said upper surface of the fixed plate and cooperating with said openings of the first plate for adjusting the flow of said first and second fluid, respectively; a control mechanism operatively connected to said movable plate for moving said valve plate in both a translational mode and rotational mode for a limited angle between closed and open positions and first and second end positions;
   the movable plate having its lower surface free from openings and recesses, said valve plate having a center portion with a basic configuration free from concave sides and concave angles, said valve plate center portion sized to cover said openings when in said closed position independently of the position of said valve plate between said first and said second end positions; said valve plate being free of any projection that spans more than approximately one-half the perimeter of said valve plate center portion;
   said control means translationally moving said movable plate between said closed and open positions and rotating said plate between said first and second end positions;
   said movable plate having its lower surface shaped and cooperating with said openings such that the angle of rotation between the first and second end positions is approximately ninety degrees or greater;
   said movable plate having a circular center portion covering said openings when said valve is in said closed position;
   a toothed projection extending from said center portion; and
   said toothed projection covering a portion of one of said openings when said valve is in an open position and slidable to a position not covering said one opening when said movable plate is rotated at approximately a midpoint between said first and second end positions while simultaneously said center portion covers approximately an area equal to or greater than the area uncovered by said toothed projection.

2. A flow control mixing valve characterized by:
   a housing structure; a fixed plate being operatively fixed within said housing structure, having an upper surface, and having at least two openings for the passage of a first and second fluid respectively; a movable plate having a lower surface positioned in sliding contact with said upper surface of the fixed plate and cooperating with said openings of the first plate for adjusting the flow of said frist and second fluid, respectively; a control mechanism operatively connected to said movable plate for moving said valve plate in both a translational mode and rotational mode for a limited angle between closed and open positions and first and second end positions;
   the movable plate having its lower surface free from openings and recesses, said valve plate having a center portion with a basic configuration free from concave sides and concave angles, said valve plate center portion sized to cover said openings when in said closed position independently of the position of said valve plate between said first and said second end positions; said valve plate being free of any projection that spans more than approximately one-half the perimeter of said valve plate center portion;
   said movable plate having a circular center portion covering said openings when said valve is in said closed position;
   a toothed projection extending from said center portion; and
   said toothed projection covering a portion of one of said openings when said valve is in an open position and being slidable to a position not covering said one opening when said movable plate is rotated at approximately a midpoint between said first and second end positions while simultaneously said center portion covers approximately an area equal to or greater than the area uncovered by said toothed projection.

3. A mixing valve as defined in claim 2 wherein:
   each of said openings in said fixed plate has an outer edge that is semi-circular in shape and positioned within a circle having a radius less than the radius of said center position of said movable plate.

4. A mixing valve as defined in claim 3 wherein:
   said fixed plate has at least one opening for said first fluid and two openings for said second fluid with said two openings divided by a bar that abuts said movable plate.

5. A mixing valve as defined in claim 4 wherein said bar divides said two openings for said second fluid in a symmetrical fashion with each of said two openings being approximately equal in size.

6. A mixing valve as defined in claim 4 wherein said bar divides said two openings for said second fluid in an assymetrical fashion with each of said two openings having differing sizes.

* * * * *